United States Patent [19]

Yang

[11] Patent Number: 4,596,270

[45] Date of Patent: Jun. 24, 1986

[54] BI-DIRECTIONAL FLOW CONTROL DEVICE

[75] Inventor: Jefferson Y. S. Yang, Orange, Calif.

[73] Assignee: Consolidated Controls Corporation, El Segundo, Calif.

[21] Appl. No.: 736,287

[22] Filed: May 20, 1985

[51] Int. Cl.⁴ .......................... F16F 9/19; F16K 17/18
[52] U.S. Cl. .................. 137/493; 188/280; 188/282; 188/322.15
[58] Field of Search ............ 137/493; 188/280, 282, 188/322.13, 322.14, 322.15

[56] References Cited

U.S. PATENT DOCUMENTS 3,483,952  12/1969  Cardwell .................. 137/493 X
4,503,882   3/1985  Brunner .................... 137/493 X

FOREIGN PATENT DOCUMENTS 1804031  5/1969  Fed. Rep. of Germany ...... 188/280
1152284  2/1958  France ............................ 188/322.15

Primary Examiner—Robert G. Nilson
Attorney, Agent, or Firm—Mason, Kolehmainen, Rathburn & Wyss

[57] ABSTRACT

A bidirectional relief valve is provided which has a slidable valve element provided with first and second groups of ports which are positioned on opposite sides of a fixed port in the valve body when the slidable valve element is in a neutral position. The valve element may be moved in either direction from the neutral position in response to the differential pressure across the damping head under selected conditions of preload which may be different in each direction. The movable valve element includes a stem portion of relatively small diameter and a larger diameter head portion in which the first and second ports are located. In order to prevent an excessive pressure build up, or overshoot, in response to a shock wave of large magnitude in either direction, the movable valve element is given an initial acceleration by employing the relatively large area of the valve head. However, as soon as the valve element has been initially accelerated the area which is effective to move the valve element is reduced to the area of the stem. With this arrangement, the pressure can be brought to the desired steady state value without causing an undesired initial pressure overshoot.

11 Claims, 14 Drawing Figures

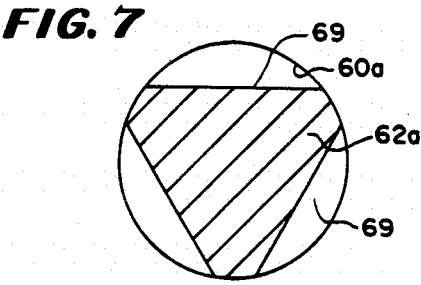
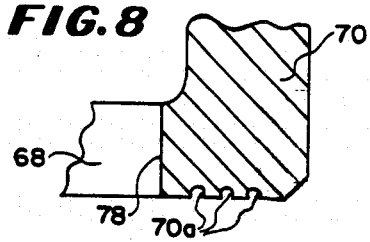
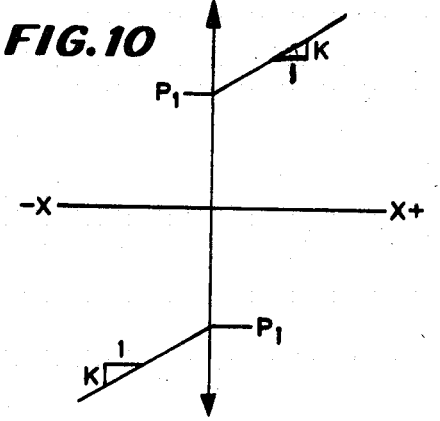
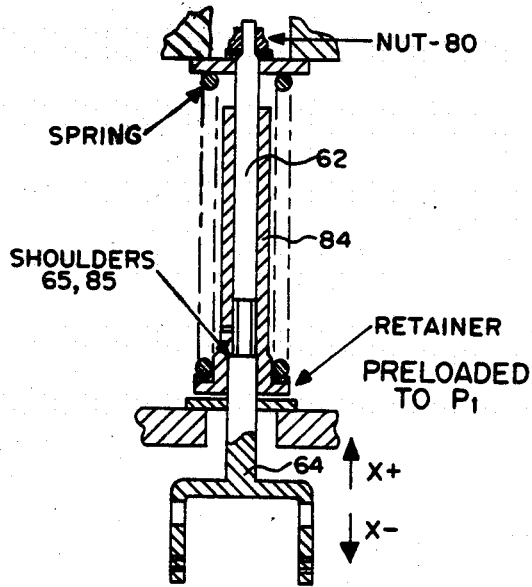
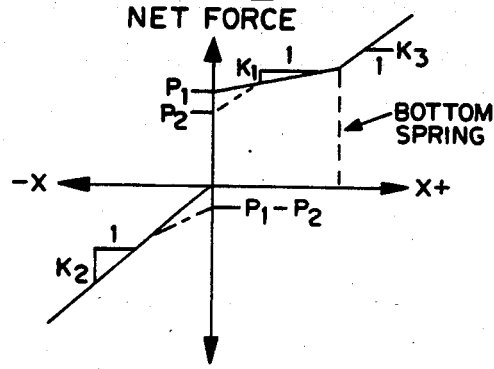
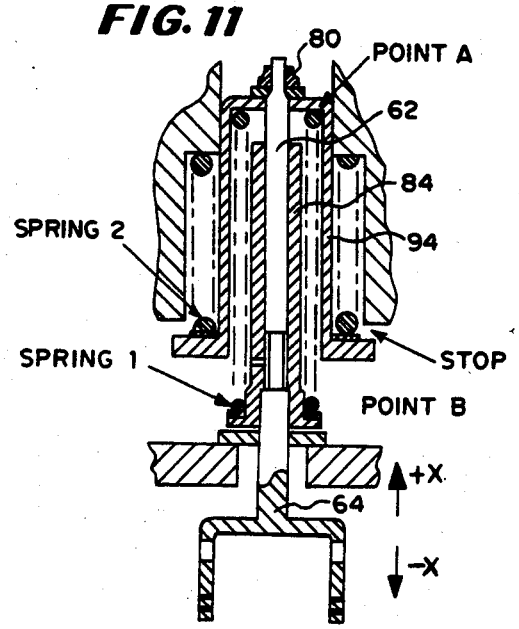
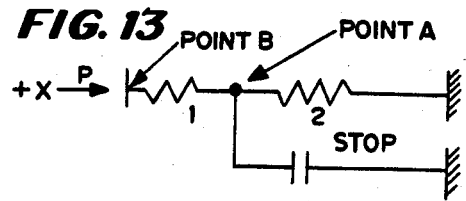
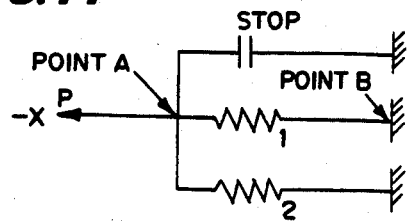

BI-DIRECTIONAL FLOW CONTROL DEVICE

BACKGROUND OF THE INVENTION

1. Field of the Invention

The present invention relates to fluid filled shock absorber apparatus and more particularly to a new and improved bi-directional flow control device for the damping head assembly of a fluid filled shock absorber apparatus which flow control device is capable of providing variable preloads and variable rate characteristics, as desired, for each direction of movement of the damping head. More particularly, the present invention relates to a fluid filled shock absorber having a cylinder and rod relatively movable therein with a damping head assembly dividing the cylinder into compartments on opposite sides and at least one bidirectional flow control valve mounted in the damping head and communicating with the compartments.

2. Brief Description of the Prior Art

Over the years a wide variety of fluid filled shock absorbing devices and damping assemblies have been developed for damping relative movement between a rod and a fluid filled cylinder supporting the rod for longitudinal displacement. U.S. Pat. Nos. 2,916,281; 3,706,362; 3,896,908; 3,945,474; 4,113,072; and 4,396,098 disclose shock absorbers and damping assemblies as do French Pat. Nos. 1.018.903 and 76 18118 and European patent publication No. 0045268. Through the piston bi-directional relief valves which are responsive to a pressure differential across the piston in either direction are also described and claimed in the copending application Ser. No. 703,346, filed Feb. 20, 1985, which is assigned to the same assignee as the present invention.

OBJECTS OF THE INVENTION

It is an object of the present invention to provide a new and improved damping assembly for fluid filled shock absorber apparatus which employs bi-directional relief valves which are particularly well suited for sophisticated applications of high force magnitude such as are needed for shock isolation systems, or the like, and are fast acting in both directions so that a desired steady state value can be achieved without an initial pressure overshoot.

It is another object of the present invention to provide a new and improved bi-directional relief valve which has reliable operation at high preload forces in one direction and provide linear operation in the opposite direction without preload.

BRIEF SUMMARY OF THE PRESENT INVENTION

The foregoing objects and other advantages of the present invention are accomplished in an embodiment illustrated herein which comprises a shock absorber having a fluid filled cylinder and a damping head mounted on a rod which is slidable in the cylinder. The damping head divides the cylinder into opposing fluid compartments on opposite sides of the head and the cylinder and rod are adapted to be connected, respectively, to external members whose relative movement is to be controlled and damped.

The damping head includes at a plurality of bi-directional relief valves in communication with the fluid compartments on opposite sides thereof which permit fluid flow between compartments under selectively controlled predetermined parameters. Each bi-directional relief valve includes a unitary valve element having first and second ports which are positioned on opposite sides of a fixed port on the damping head when the valve element is in a neutral position. The valve element may be moved in either direction from the neutral position in response to the differential pressure across the damping head under selected conditions of preload which may be different in each direction.

The movable valve element includes a stem portion of relatively small diameter and a larger diameter head portion in which the first and second ports are located. In order to prevent an excessive pressure build up, or overshoot, in response to a shock wave of large magnitude in either direction, the movable valve element is given an initial acceleration by employing the relatively large area of the valve head. However, as soon as the valve element has been initially accelerated the area which is effective to move the valve element is reduced to the area of the stem. With this arrangement, the pressure can be brought to the desired steady state value without causing an undesired initial pressure overshoot.

BRIEF DESCRIPTION OF THE DRAWING

For a better understanding of the invention, reference should be had to the following detailed description taken in conjunction with the drawing in which:

FIG. 7 is a transverse, cross-sectional view of the stem of the valve element taken substantially along line 7—7 of FIG. 5;

FIG. 8 is a fragmentary, longitudinal cross-sectional view of a portion of the skirt of the valve element taken adjacent a bottom wall thereof;

FIG. 9 is a longitudinal, cross sectional view in diagrammatic form of a bi-directional relief valve assembly employing a single bias spring;

FIG. 10 is a graphical representation of the force versus displacement operating characteristic of the bi-directional relief valve assembly of FIG. 9;

FIG. 11 is a longitudinal, cross-sectional view in diagrammatic form of another embodiment of a bi-directional relief valve assembly employing a pair of bias springs;

FIG. 12 is a graphical representation of the force versus displacement operating characteristic of the bi-directional relief valve assembly of FIG. 11;

FIG. 13 is a schematic diagram illustrating one mode of operation of the bi-directional relief valve assembly of FIG. 11; and FIG. 14 is a schematic diagram illustrating another mode of operation of the relief valve assembly of FIG. 11.

DETAILED DESCRIPTION OF PREFERRED EMBODIMENT

Figure 1:
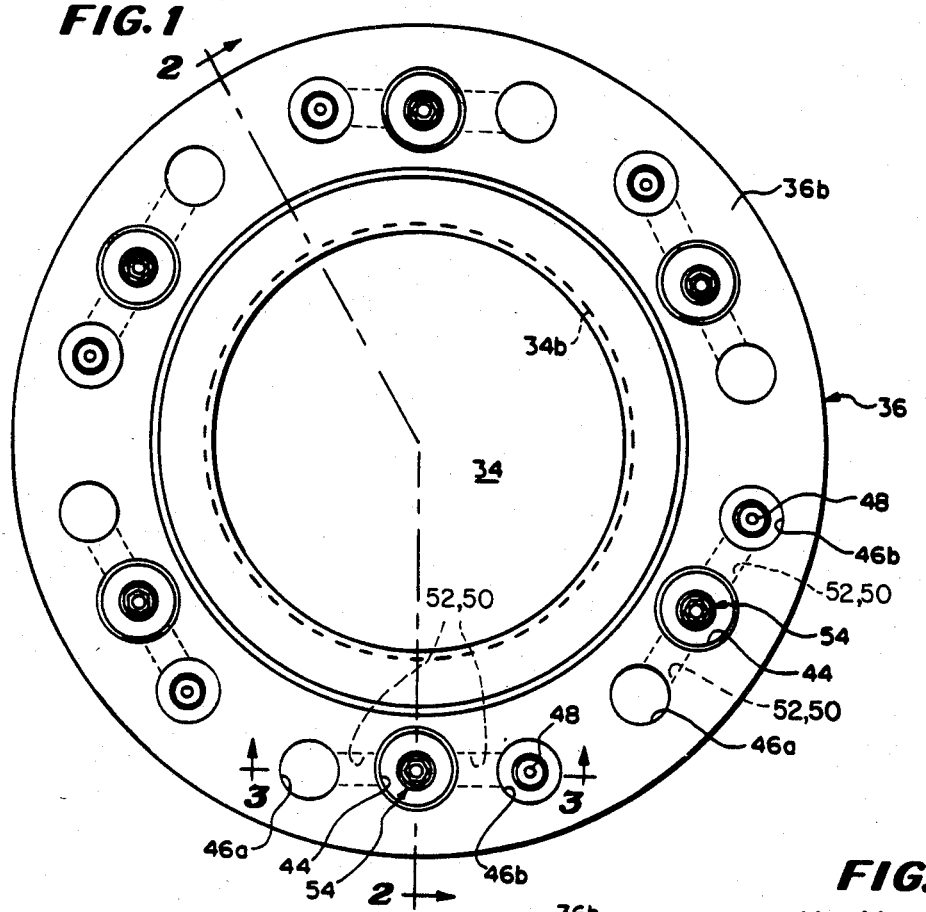
FIG. 1 is an elevational view of one end of a damping head assembly employing bi-directional relief valves constructed in accordance with the features of the present invention.
Figure 2:
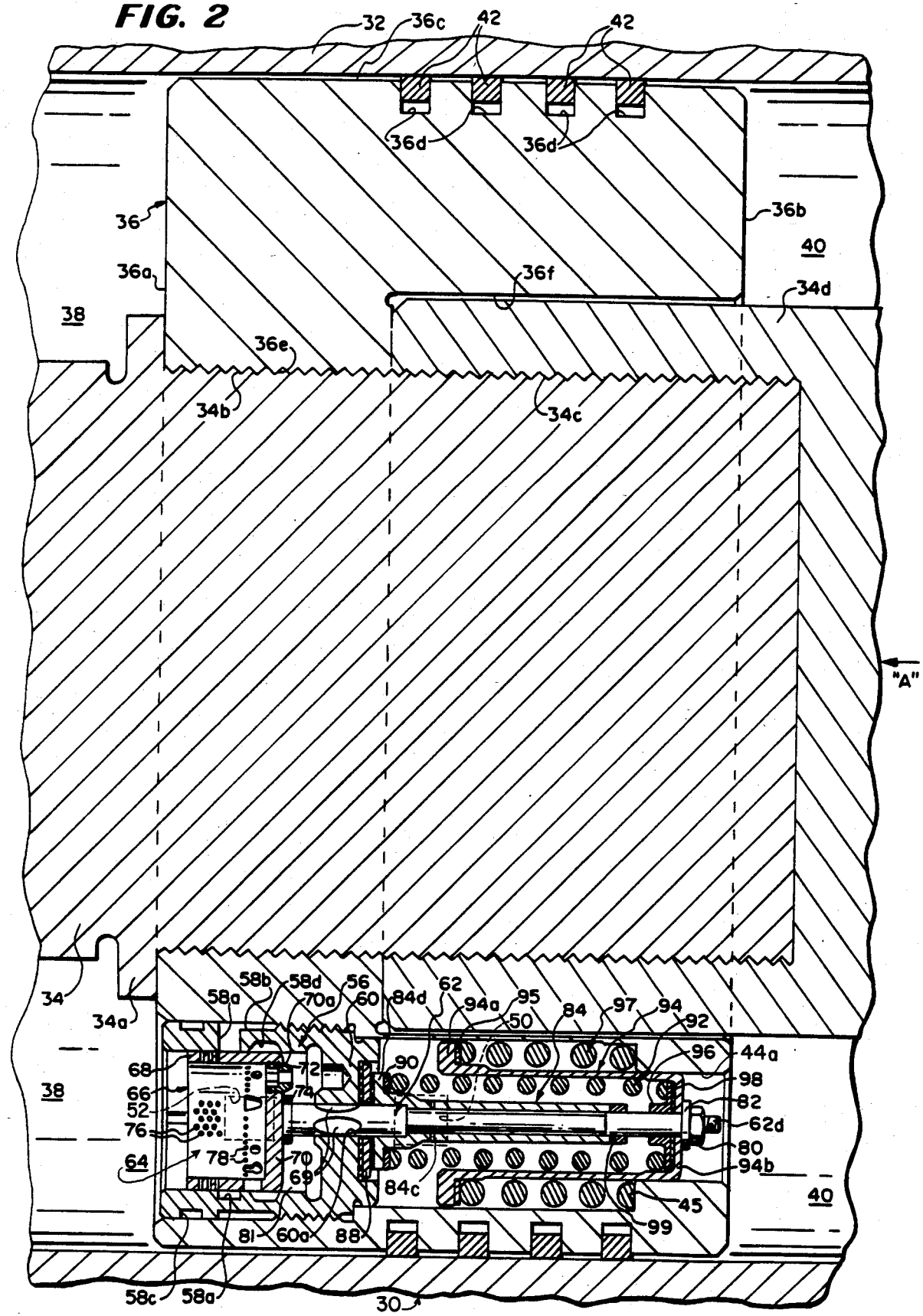
FIG. 2 is a cross-sectional view taken substantially along line 2—2 of FIG. 1 and illustrating the immediately surrounding portions of a cylinder and rod of a fluid filled shock absorber having opposed fluid compartments or chambers separated by the head assembly.

Referring now more particularly to the drawings and in particular FIGS. 1–8, therein is illustrated a new and improved, fluid filled shock absorber apparatus constructed in accordance with the features of the present invention and referred to generally in FIG. 2 by the reference numeral 30. The shock absorber is of a generally elongate, cylindrical shape and includes a cylinder wall 32 and an axial rod 34 mounted for sliding movement relative thereto. The rod 34 includes a left hand portion 34a having an annular stop and a threaded portion 34b engaged within an internally threaded bore 34c of a right hand rod portion 34d assembled together with the lefthand rod portion 34a. Outer end portions of the cylinder 32 and the rod 34 are adapted to be connected to external members whose relative movement is to be damped by the shock absorber 30.

The shock absorber includes an annular piston or damping head assembly 36 mounted for longitudinal sliding movement within the cylinder 32 and dividing the cylinder into separate, fluid filled compartments or chambers 38 and 40 on opposite side faces 36a and 36b of the annular piston head. An outer surface 36c of the annular piston head is formed with a plurality of annular grooves 36d in which piston rings 42 are mounted for preventing direct fluid flow between the respective fluid compartments 38 and 40 around the outer surface of the piston head.

The piston head is provided with a stepped diameter internal axial bore having a threaded segment 36e for receiving the threaded segment 34b of the piston rod and a larger diameter, section 36f for accommodating the lefthand end portion of the righthand rod segment 34d as shown in FIG. 2. The annular piston head 36 is thus secured to the elongated piston rod 34 for movement therewith in the cylinder 32 between opposite ends in a controlled characteristic damping response to relative forces exerted on and between the external members connected to the cylinder and the rod respectively.

Figure 3:
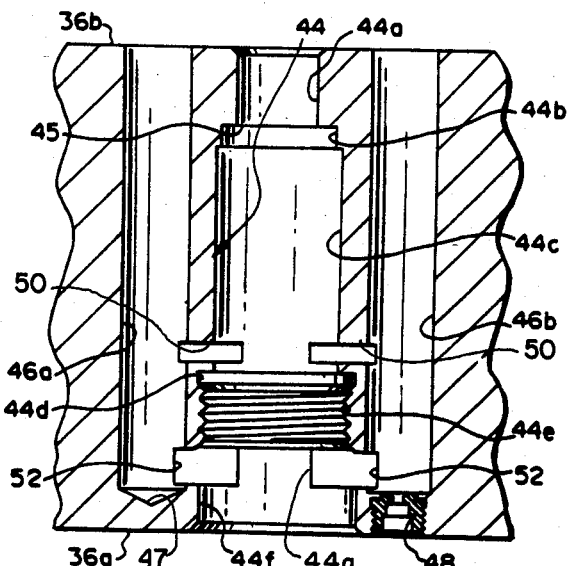
FIG. 3 is a fragmentary, cross-sectional view taken substantially along line 3—3 of FIG. 1.
Figure 4:
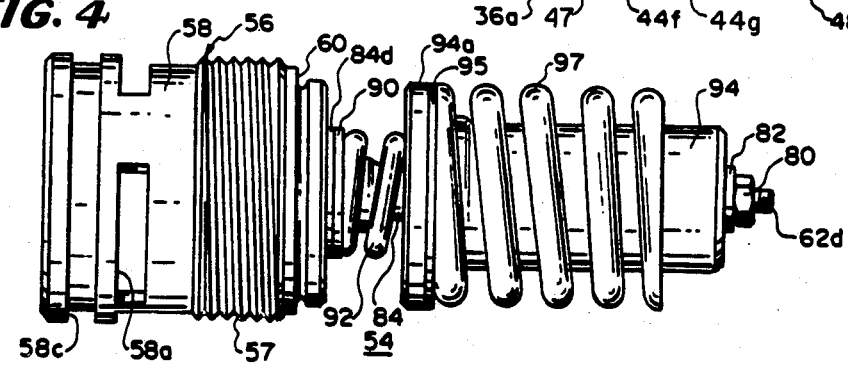
FIG. 4 is a side elevational view of a new and improved bi-directional relief valve constructed in accordance with the features of the present invention for use in the damping head assembly.

Referring now specifically to FIGS. 1 and 3, the annular piston head assembly 36 is provided with a plurality of axially extending, generally cylindrical, valve bores or passages 44 positioned and spaced equilaterally around the circumference of the annular piston head 36 and extending between the opposite side faces 36a and 36b of the head as illustrated. In the illustrated embodiment, a total of 6 valve passages 44 are provided and spaced at 60° intervals around the circumference of the piston head and it is to be understood that a greater or lesser number may be utilized to provide a particular damping characteristic as required for a particular application. In association with each valve bore there is provided a pair of parallel, secondary bores or passages 46a and 46b, respectively, disposed on opposite sides of the central valve passage 44. The passages 46a and 46b are open for communication with the right-hand fluid compartment 40 (FIG. 2). The passage or bore 46a terminates short of the piston head face 36a at a blind end 47 and the passage 46b provides direct fluid communication between the opposite head faces 36a and 36b through a metering orifice insert 48 which is threaded into the passage 46b adjacent the face 36a. Thus, direct fluid communication is provided between the chambers 38 and 40 on opposite sides of the damping head piston 36 via the restricted orifice inserts, which have small diameter orifices and which are spaced equilaterally around the annular head 36 as illustrated to provide a predetermined minimum flow between the chambers 36 and 40.

As illustrated in FIG. 3, each valve passage 44 is formed with a plurality of segments 44a, 44b, 44c and 44d of ever increasing diameter progressing from the head face 36b towards the face 36a. The small diameter inlet section 44a is in open communication with the fluid chamber 40 and the next intermediate sections 44b and 44c are in communication with the respective passages 46a and 46b through a plurality of radial slots 50 (FIG. 3), which slots are equilaterally disposed around the circumference of the valve passage 44. A threaded section 44e is provided in the passage 44 between the intermediate segment 44d of slightly larger diameter and a larger diameter segment 44f which opens onto the face 36a of the piston head in communication with the fluid-filled cylinder compartment 38. Direct fluid communication is provided between the adjacent group of passages 46a and 46b and the segment 44g of each valve passage 44 through a plurality of radial, feeder slots 52 which are spaced equilaterally around the central passage 44 as shown in FIGS. 2 and 3. The radial feed passages 50 and 52 provide communication between the open ended, parallel fluid passages 46a and 46b on each side of a central valve passage 44 and the passage segments 44c and 44f adjacent opposite ends of the threaded segment 44e.

Figure 5:
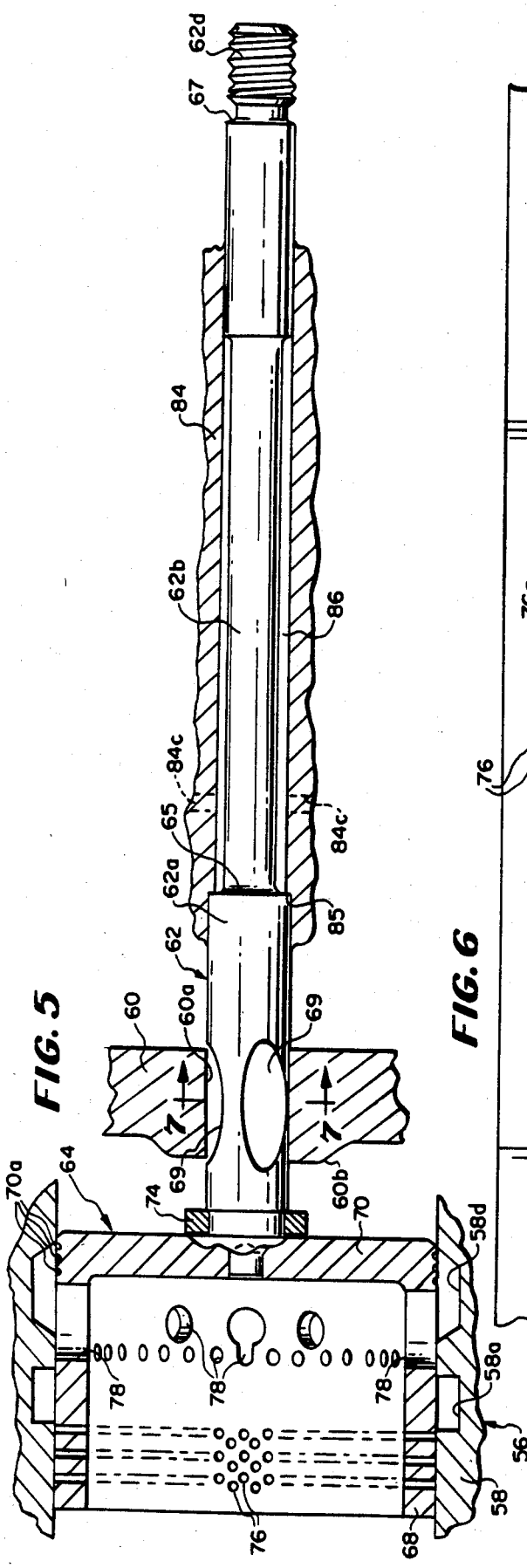
FIG. 5 is an enlarged, elevational view of the unitary valve element of the bi-directional relief valve of FIG. 4 with portions shown in section and surrounding elements shown in phantom.
Figure 6:
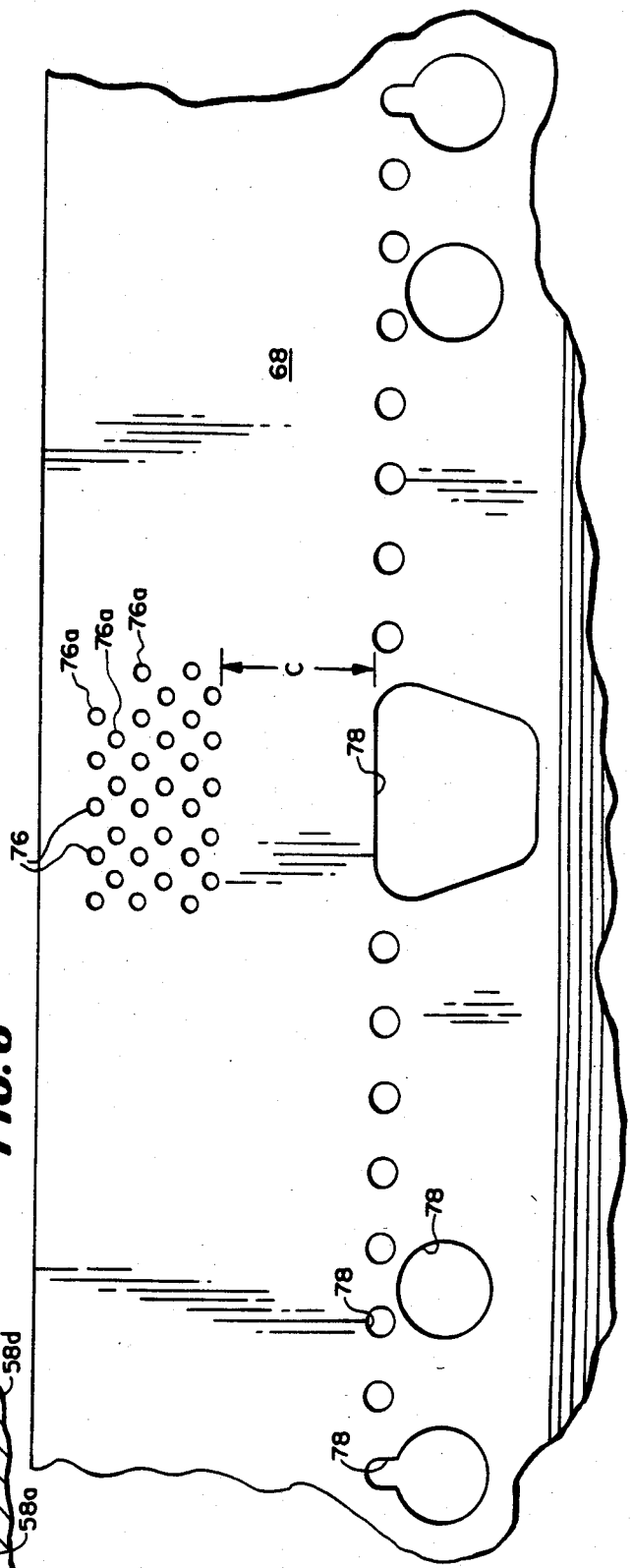
FIG. 6 is a fragmentary, enlarged elevational view of a portion of a cylindrical skirt of the valve element of FIG. 5.

The damping head assembly 36 includes a plurality of bi-directional relief valves (FIG. 4) 54, mounted in each of the primary valve bores or passages 44 formed in the annular piston head 36. Each bi-directional relief valve includes a cup shaped valve seat member 56 threadedly engaged in a fixed position in the threaded bore segment 44e of a valve passage 44. Each cup shaped valve seat includes a generally cylindrical, side wall 58 having an open outer end in communication with the fluid chamber or compartment 38 to the left of the piston head 36 as shown in FIG. 2. The cylindrical side wall 58 has a threaded segment 57 adjacent an inner end portion adapted to be seated in threaded engagement within the threaded segment 44e of the valve passage 44. The valve seat 56 also includes an integral, annular, bottom wall 60 having a circular opening 60a in the center thereof in order to slidably accommodate an elongate stem 62 of a valve member 64 disposed for axial sliding movement in the each valve passage 44 as best shown in FIG. 2 and 5. The slidable valve element 64 includes a cup shaped portion or head 66 mounted for sliding movement within the interior of the fixedly positioned cup-shaped valve seat 56. The cup shaped head 66 includes a generally cylindrical skirt 68 having an outer diameter dimensioned so that the skirt will slide freely within the cylindrical side wall 58 of the cup shaped valve seat 56. The inner end of the skirt 68 is integrally joined to a circular bottom wall 70 which in turn is integrally joined with the elongated stem 62 of the movable valve element 64.

The cup-shaped cylindrical sidewall 58 of the fixed valve seat insert 56 is formed with a plurality of radial slots or ports 58a in communication between the interior of the sidewall and an annular recess or band 58b extending around the sidewall in direct communication with the radial fluid passages 52 formed in the damping head 36. The sidewall 58 is also provided with a second annular recess 58c on the outer surface thereof which is adopted to receive an O-ring (not shown) to provide a tight seal between the valve seat 56 and the damping head 36. The interior surface of the sidewall 58 is generally cylindrical in shape and provides a smooth valve surface for engaging the outer surface of the skirt 68 of the cup-shaped head portion 66 of the sliding valve element 64, the interior surface of this sidewall being provided with an annular groove 58d spaced between the ports 58a and the end wall 60. The bottom wall 70 of the cup-shaped valve head 66 is formed with a pair of threaded apertures 70a on opposite sides of the axis of the stem 62 each of which receives a damping orifice insert 72 designed to limit the flow through the end wall 70 under some conditions, as will be described in more detail hereinafter. However, considered generally, the orifices 72 provide communication to the chamber 81 behind the valve head 66 so that under certain conditions the pressure of the fluid in the cylinder chamber 38 is exerted on the valve stem 62 adjacent the wall 60. In order to limit movement of the slidable valve element 64 toward the right as viewed in FIG. 2, and prevent damage to the orifices 72, an annular member 74 is mounted on the stem 62 adjacent the bottom wall 70 and engages an annular protruding rib 60b formed on the wall 60 around the central stem opening 60a as best shown in FIG. 5.

The elongated stem 62 includes a first segment 62a adjacent the cup-shaped valve element 64 and an intermediate segment 62b of reduced diameter (FIG. 5) which defines a shoulder 65 between the segments 62a and 62b. At the outer end the stem 62 is formed with the threaded section 62d on which is threaded a stop nut 80 and stop washer 82 which bears against an annular stop surface 67 on the stem 62.

An elongated tubular sleeve 84 is mounted on the valve stem 62 for movement in unison therewith when the stem moves to the right as viewed in FIG. 2, the sleeve 84 remaining stationary when the stem 62 moves toward the left. More particularly, the sleeve 84 is provided with an internal shoulder 85 which is adapted to engage the shoulder 65 on the valve stem 62. The sleeve 84 also includes a radially extending end flange 84d integral with the body portion of the sleeve which is held against the end wall 60 of the valve seat 56 by a first coil spring 92. More particularly, an annular spacer 88 is positioned between the end wall 60 and the end flange 84d and an annular spring shim 90 is positioned between the flange 84d and one end of a first coil spring 92. A portion of the coil spring 92 is positioned within a cylindrically shaped cup member 94 the outer end portion of which extends into the valve passage segment 44a in the damping head 36, as shown in FIG. 2. The cup member has a radially outwardly extending relatively thick flange 94a and includes an annular bottom wall 94b having a central aperture therein for accomodating the stem 62 which passes therethrough. The outer end of the coil spring 92 is adapted to engage a radial flange segment of a hat-shaped spacer 96 and a washer like shim 98 is positioned between the hat-shaped spacer flange and the bottom wall 94b of the cup shaped member 94. The spacer 96 includes a tubular body portion having an inner end face adapted to provide an annular stop surface for engagement with a tubular spacer 99 on the stem 62 at the outer end of the sleeve 84, as shown in FIG. 2. An annular shim 95 is provided adjacent the outwardly extending flange 94a of the cup-shaped member 94 and a second larger coil spring 97 is positioned between the shim 95 and the shoulder 45 formed in the damping head 36 (FIG. 3).

In order that the pressure in the chamber 40 on the right hand side of the damping head 36 is supplied to the valve stem 62, the sleeve 84 is provided with the radial ports 84c which provide communication between the bore 44 of the damping head 36 and a fluid chamber 86 between the reduced diameter portion 62b of the stem 62 and the sleeve 84. Accordingly, the pressure in the chamber 40 is supplied to the stem shoulder 65 on one side of the wall 60 and the pressure in the chamber 38 is supplied through the orifices 72 to the stem 62 on the other side of the wall 60.

The cylindrical skirt 68 of the movable valve element 64 is provided with a first band of ports 76 or openings in the skirt 68 and a second band of ports 78 which are spaced from the first band 76 by a distance "C" (FIG. 6) which is just slightly greater than the width of the fixed ports 58a in the wall 58 of the fixed valve seat 56. When the valve element 64 moves to the right as viewed in FIG. 2 in response to an increase in pressure in the chamber 38, the ports 76 are moved into alignment with the fixed ports 58a and fluid is permitted to flow from the interior of the valve element 64 through the ports 76 and 58a, and through the passageways 52 and 46a and 46b to the chamber 40 on the other side of the damping head 36. On the other hand, when the valve element 64 moves in the opposite direction in response to an increase in pressure in the chamber 40, the ports 78 are moved into alignment with the fixed ports 58a and fluid is permitted to flow through the passageways 46a, 46b, and 52 and through the ports 58a and 78 into the interior of the valve element 64 and hence into the chamber 38. During movement of the valve element 64 in both directions as described, the pressure of the fluid in the chamber 40 is continuously supplied to the valve bore segment 44c through the radial passages 50. When the valve 64 is in the neutral postion (FIG. 5), the pressure of the fluid in the valve bore segment 44c is transmitted into the chamber 81 via passages formed between a plurality of oval shaped recesses or grooves 69 formed on the stem segment 62a and the surrounding central bore 60a of the valve element bottom wall 60. When the valve 64 is in the neutral position (FIG. 5), the fluid pressure in the chamber 81 acts upon the bottom wall 70 of the cup shaped head portion 66 of the valve 64 to initiate movement of the valve toward the left (arrow A -FIG. 2) upon an increase of the pressure in the cylinder chamber 40.

The bidirectional relief valves 54 are each preloaded by the springs 92 and 97 so that these valves do not open in response to movement of the damping head 36 in the direction A shown in FIG. 2, which may be called the compression direction, until the pressure in the chamber 38 exceeds the pressure in the chamber 40 by a very large amount. For example, each of the valves 54 can be preloaded so that it will not open, i.e., the valve element 64 will not move, until the pressure in the chamber 38 exceeds the pressure in the chamber 40 by approximately 4500 psi. When it is realized that the damping head 36 may have an overall diameter of 12 inches it can be seen that an enormous damping force will be provided in the chamber 38 before the valves 54 open. Furthermore, it may be desirable to have the flow rate through the valves 54 vary linearly with stroke once the preload pressure is exceeded so that an extremely high damping force may be exerted for several feet of travel of the damping head 36 in the compression direction A.

With such a high preload force on the valve element 64 it has been found that when the ports 76 are in the form of relatively large openings the valve element 64 will stick and will not open as desired when the preload force is exceeded. The sticking action of the valve element 64 is due to the flow reaction forces produced in accordance with Bernoulli's law of hydrodynamics as the valve element 64 is just cracked open slightly, these reaction forces being due to the deflection of fluid flow as it strikes the edge of the fixed ports 58a and acting on the valve element 64 to prevent it from opening. These Bernoulli reaction forces are minimized by providing the ports 76 which comprise a large number of very small openings through the skirt portion 68 which are preferably arranged in parallel rows 76a (FIGS. 5 and 6), the ports in one row being staggered relative to the ports in the next row. With such an arrangement, the flow area varies linearly with pressure for movement in the compression direction and the flow area is linear with stroke in the compression direction but the preload prevents movement before the preload is overcome. Minimizing of the Bernoulli reaction effect thus permits highly accurate flow control with the bi-directional relief valves 54 at the extremely high pressure levels described above. Preferably, the ports in each row have a diameter such that a slight overlap is provided between the ports in adjacent parallel rows 76a. With the preloads and force levels described above it has been found that sticking action due to the Bernoulli reaction effect is substantially eliminated when the ports 76 comprise 240 holes of 0.033 inches diameter arranged in four slightly overlapping rows 76a of 60 holes each, with the holes spaced 0.01 inches apart in each row. In the alternative, a large number of helical slot segments arranged in rows can be employed as the ports 76.

Considering now the manner in which a high preload force is exerted on the valve element 64 to prevent it from opening until a large differential pressure is produced between the chambers 38 and 40, it will be seen from FIG. 2 that when the valve element 64 is in the neutral position shown in this figure the shoulder 65 on the stem 62 is in engagement with the shoulder 85 on the sleeve 84. Accordingly, the spring 92 which is positioned between the flange 84d of the sleeve 84 and the end wall 94b of the cup member 94, acts in series with the spring 97, which is positioned between the flange 94a of the cup member 94 and the shoulder 45 on the damping head 36, to resist movement of the valve element 64 to the right until the preload force of these two springs acting in series is exceeded. However, since the springs 92 and 97 are connected in series their effective spring rate is lower than the spring rate of either spring considered individually so that once the preload force is exceeded successive rows of ports 76 may be moved into registration with the fixed ports 58a and increase the flow area so that the damping head 36 may move at a relatively high velocity over a distance of several feet while maintaining the pressure differential across the damping head at substantially the same preload value.

The bidirectional relief valves 54 are arranged to have no preload for movement of the damping head 36 in a direction opposite to the direction A, which may be called the extension direction. Furthermore, the spring rate of the valve element 64 for movement in the extension direction is substantially greater than for movement in the compression direction. In order to provide no initial preload in the extension direction, the spring 97 is made to exactly balance the spring 92. Accordingly, when the valve element moves 64 to the left the shoulder 65 on the valve stem 62 moves away from the shoulder 85 on the sleeve 84 as the sleeve remains biased against the end wall 60 of the fixed valve seat 56. When this extension motion occurs only the spring 92 is compressed while the preload compression on the outer spring 97 is actually relaxed. It will thus be seen that for movement in the extension direction the two springs 92 and 97 act in parallel and the spring constant of this parallel combination is the sum of the individual spring constants of the springs 92 and 97. Accordingly, a much stronger spring rate is provided for movement in the extension direction than for movement in the compression direction. The ports 78 may be designed to give any desired flow characteristic for movement in the extension direction. In the illustrated embodiment, the ports 78 are designed to provide a flow area which varies with pressure as a parabola. It will thus be seen that different flow characteristics may be provided for movement of the valve element 64 in either direction and these flow characteristics are entirely independent of one another. Preferably, the ports 76 and 78 are positioned relatively close to the fixed ports 58a when the valve element 64 is in the neutral position shown in FIG. 2 so that the desired flow characteristic is initiated quickly in response to movement in either direction. For example, the edge of the initial row of ports 76a may be spaced 0.002 inches from the adjacent edge of the fixed ports 58a and the inner edges of the ports 78 may be spaced 0.010 inches from the other edge of the ports 58a.

Considering now in more detail how the springs 92 and 97 are initially balanced, the bidirectional relief valve 54 is first assembled without the outer spring 97 and the desired preload on the spring 92 is obtained by tightening the nut 80. This preload can then be measured and if it is not exactly correct the shims 90 and 98 can be changed to obtain exactly the desired preload. The outer spring 97 is then added and the valve 54 threaded into the damping head 36. The shim 95 is then adjusted so that the spring 97 exactly balances the spring 92. If too thin a shim is used the load on the outer spring 97 is less than the load on the inner spring 92 and a little force will be exerted on the cup member 94. This can be checked by measuring the force on the end of the nut 80 required to move it. When the two springs are exactly balanced there is no force on the nut 80 and the valve element 64 can be rotated freely.

As described heretofore, the pressure in the chamber 40 is supplied to the stem 62 through the ports 84c and the pressure in the chamber 38 is supplied through the orifices 72 to the stem 62 on the other side of the wall 60. When the valve stem 62 is subjected to a high pressure shock wave in either direction the valve element 64 must move very quickly in the desired direction in order to establish the desired relief pressure and prevent an excessive pressure build up or overshoot, which exceeds the desired steady state value of damping pressure. This is true even for movement in the extension direction in which the valve element 64 is not preloaded, because even with zero preload, the valve element 64 initially has to respond very quickly to a high pressure shock wave in the extension direction in order to obtain the desired linear pressure versus flow characteristic.

In accordance with the present invention, an arrangement is provided whereby the much larger area of the valve head 66 is employed to provide an initial large force for accelerating the valve element 64 from its neutral position. However, as soon as the valve element 64 has been initially accelerated the effective area is reduced to the area of the stem 62. More particularly, as illustrated in FIGS. 5 and 7 the maximum diameter segment 62a of the stem 62 is provided with three flat bottomed recesses or grooves 69 spaced equilaterally around the surface thereof which have a length along the stem that is slightly greater than the thickness of the bottom wall 60 at the central aperture 60a therein. More particularly, as shown in FIG. 5, when the valve element 64 is in the neutral position the opposite ends of the stem recesses 69 project beyond adjacent wall faces of the bottom wall 60 so that direct fluid communication is provided across the bottom wall 60 to the chamber 81 between the wall 60 and the valve head 66. Preferably, the end portions of the recesses 69 project beyond the sides of the wall 60 by 0.020 inches and the total flow area provided by the recesses 69 is at least equal to the flow area of the damping orifices 72. Considering first the response to a high pressure shock wave in the compression direction A, before the preload is exceeded there is little flow through the recesses 69 and they act like one of the fixed orifices 48. When the valve head 66 is hit with a large force, due to movement of the damping assembly in the compression direction, it is moved quickly since this force is acting over the entire area of the valve head which is many times greater than the area of the stem 62, so that the valve element 64 is given an initial acceleration or boost when the preload is exceeded. This initial acceleration or boost is produced because the chamber 81 is initially at low pressure due to the flow through the recesses 69 and the flow rate into the chamber 81 is limited by the orifices 72. However, as soon as the valve stem 62 has moved 0.020 inches the recesses 69 are closed off and the chamber 81 is almost immediately pressurized as the valve head 66 continues to move toward the wall 60. The area on which the high pressure fluid can exert force on the valve element 64 is then reduced to the cross sectional area of the stem portion 62a which is journalled in the wall 60. Accordingly, the recesses 69 act only to give an initial acceleration to the valve element 64 when the damping head 36 is moved in the compression direction and prevent the development of an undesired pressure overshoot so that the pressure in the chamber 38 builds up smoothly to the desired steady state value. Similarly, when the damping assembly is moved in the extension direction in response to a high pressure shock wave the total area of the valve head 66 is active to provide an initial acceleration of the valve element 64 in the extension direction. However, as soon as the valve stem 62a moves 0.020 inches the recesses 69 are closed off and pressure in the chamber 40 is exerted only on the much smaller cross sectional area of the stem portion 62a.

The orifices 72 also act as damping orifices to reduce oscillation or hunting of the valve element 64. These orifices act as a damping resistance to the large capacitance represented by the fluid in the chamber 81 and tend to reduce overshoot movement of the valve 64 in response to a high amplitude shock wave.

In accordance with a further aspect of the invention an arrangement is provided to prevent the valve element 64 from sticking when the damping assembly 36 is moved in the extension direction and the pressure increases in the compartment 40. More particularly, a groove 58d is provided in the fixed valve seat 56. When the valve element 64 is in the neutral position shown in FIGS. 2 and 5 the groove 58d is not in communication with the chamber 81 since the rear wall 70 of the valve head 66 closes off such communication. However, when the damping assembly 36 is subjected to a high pressure shock wave in the extension direction and the valve head 66 moves to the left as viewed in FIG. 2, the groove 58d provides a passageway between the extension flow control openings 78 and the chamber 81 so as to minimize axial flow forces on the valve head 66 and permit the valve head 66 to move linearly in the extension direction. If the groove 58d is not provided it has been found that part of the flow from the passageway 58a through the openings 78 to the interior of the valve head 66 is diverted and flows at high velocity through the clearance space between the valve head 66 and the adjacent wall of the fixed valve seat 56. The high velocity flow through this clearance space produces an axial force on the valve element 64 which prevents it from moving to the left until this force is overcome. As a result the pressure in the chamber 40 does not increase linearly, as desired, but instead remains low until the above described axial force is overcome at which time the pressure in the chamber 40 increase abruptly. By providing the groove 58d the above described high velocity flow is prevented since the groove 58d connects the openings 78 to the chamber 81 as soon as the valve element 64 is given an initial acceleration in the extension direction by the above-described shaft boost action of the openings 69. It will also be noted that when the valve head 66 is subjected to a high pressure shock wave in the compression direction A and the valve element 64 moves to the right, the high pressure fluid within the skirt 68, which will flow through the extension ports 78 into the groove 58d, cannot flow into the chamber 81 and negate the large pressure area of the valve head 66 so that the above described initial acceleration of the valve element 64 can be achieved. Preferably, the valve element 64 is provided with the grooves 70a (FIGS. 5 and 8) in the outer edge of the rear wall 70 thereof which provide a means for the pressure to become uniformly distributed around the periphery of the skirt portion 68 during movement in the compression direction.

The arrangement of FIGS. 1-8 inclusive, wherein the interconnection of the valve stem 62 and the sleeve 84 through the shoulders 65 and 85 makes possible the provision of a large preload in one direction and no preload in the opposite direction, may be modified by employing a wide variety of spring combinations and stop surfaces to achieve different flow rate characteristics and preloading in each direction. In FIGS. 9-13 two additional arrangements are disclosed wherein the spring and stop surfaces are shown diagrammatically together with the operating characteristics achieved thereby.

Referring first to the arrangement shown in FIGS. 9 and 10, a single spring may be used to create a preload in each direction of movement of the valve element 64 as indicated by the arrows +x and −x in FIG. 9. When the valve stem 62 moves in the +x direction the shoulders 65, 85 are engaged and the sleeve 84 pushes against the single spring. Motion does not occur until the spring preload is overcome. When the valve element 64 is moved in the −x direction the shoulders 65, 85 separate and force is then transmitted to the other end of the spring through the nut 80. Again, movement in the −x direction will not occur until the spring preload is overcome and the preload is the same in each direction because only a single spring is utilized. FIG. 10 illustrates the operating characteristic of the single spring arrangement of FIG. 9 and shows a preload value P1 before movement can occur in either direction. When such movement does occur it is dependent upon the stiffness or spring constant K of the single spring, as shown by the slope of the displacement characteristics shown in FIG. 10.

FIGS. 11-13 illustrate diagrammatically and schematically a double spring arrangement similar to that of FIGS. 1-8 described previously except that an additional stop is provided to limit the motion of spring No. 2 (which corresponds to spring 97 in the arrangement of FIGS. 1-8). When the valve element 64 moves in the +x direction, which corresponds to the compression direction in FIGS. 1-8, the shoulders 65, 85 are engaged so that spring No. 1 (FIG. 11), which corresponds to the spring 92 in FIGS. 1-8, is compressed. Spring No. 1 pushes against the bottom wall of the cup member 94 at point A and the member 94 pushes against spring No. 2, which corresponds to spring 97 of FIGS. 1-8. Initially the preload P1 of spring No. 1 is precisely balanced by the equal and opposite preload provided in spring No. 2 so that no motion occurs until this preload is overcome, as described previously in connection with FIGS. 1-8. When the preload P1 is overcome both springs are compressed and the combined spring rate K1 is equal to the product of the spring No. 1 and spring No. 2 spring constants divided by the sum of these spring constants because the springs act in series in the compression (+x) direction. After a selected amount of displacement in the compression (+x) direction, indicated by the dotted line in FIG. 12 labelled "bottom spring" the flange of the cup member 94 strikes the fixed stop surface shown in FIG. 11 and the outer spring No. 2 becomes inoperative. At this point only spring No. 1 is further compressed by continued displacement in the +x direction and the stiffness is increased accordingly, as shown by the the spring constant K3 in FIG. 12. The operating characteristic in the +x direction is shown schematically in FIG. 13 wherein spring No. 1 (indicated by the numeral 1) and spring No. 2 (indicated by the numeral 2) are shown connected in series and and are both effective until point A (the cup member 94) hits the fixed stop, after which only spring No. 1 is effective.

For displacement in the extension (−x) direction the shoulders 65, 85 disengage and the load is transmitted through the nut 80. The preload P1 in spring No. 1 is exactly balanced against spring No. 2 so that point A moves with no preload. As the valve element 64 moves in the extension (−x) direction spring No. 1 is compressed while spring No. 2 is actually relaxed and the springs are seen to act in parallel, as described heretofore in connection with FIGS. 1-8, and shown schematically in FIG. 14. The combined spring rate K2 for movement in the extension (−x) direction is thus equal to the sum of the individual spring rates of spring No. 1 and spring No. 2.

From FIG. 12 it can be seen that the arrangement of FIG. 11 gives a combined effect of a preload in one direction with no preload in the opposite direction and with a much stronger effective spring constant K2 provided in the extension (−x) direction than in the compression (+x) direction. In these respects the arrangements of FIG. 11 is identical to that of FIGS. 1-8. In the compression (+x) direction the effective spring is initially very soft and moves at a rate K1 as indicated in FIG. 12, which is again similar to FIGS. 1-8. However, after the stop is engaged by the cup member 94 spring No. 2 is inactive and the effective spring rate K3 is much stiffer but never as stiff as in the extension (−x) direction.

The composite spring constant K1 for movement in the compression (+x) direction and the composite spring constant K2 for movement in the extension (−x) direction can be selected virtually at will in accordance with a desired application. Once the constants K1 and K2 have been selected the stiffnesses of each individual spring No. 1 and spring No. 2 can be determined in accordance with the following equations:

$$K(\text{spring No. 1}) = \frac{K2 - \sqrt{K2^2 - 4K1 \times K2}}{2}$$

$$K(\text{spring No. 2}) = \frac{K2 + \sqrt{K2^2 - 4K1 \times K2}}{2}$$

From these formulae it can be seen that K2 (the composite spring constant for movement in the extension (−x) direction) must always be at least four times greater than K1 (the composite spring constant for compression movement) in the arrangement of FIG. 11, and also in the arrangement of FIGS. 1-8.

For some applications spring No. 2 may be given a preload P2 (FIG. 12) which is not as high as the preload P1 of spring No. 1. In such applications, motion would occur in spring No. 2 first in both directions. In the compression (+x) direction motion would occur when the load reaches P2 the preload of spring No. 2 and would continue at the spring rate of spring No. 2 until P1 is reached, as shown in dotted lines in FIG. 12. In the extension (−x) direction there is a preload equal to the difference between the two preloads P1 and P2, and the extension characteristic is modified as indicated in dotted lines in FIG. 12.

Although the present invention has been described with reference to a single illustrated embodiment thereof, it should be understood that numerous other modifications and embodiments can be made by those skilled in the art that will fall within the spirit and scope of the principles of this invention.

What is claimed as new and desired to be secured by Letters Patent of the United States is:

1. A bidirectional relief valve for use in a damping head assembly, comprising a valve body having a cylindrical recess therein terminating in an end wall thereof;
   a valve element having a stem slidably mounted in said end wall and having a hollow skirt portion movable within said cylindrical recess in said valve body, said skirt portion having a bottom wall connected to said stem and having a diameter subatantially greater than said stem;
   first and second port means in said skirt portion;
   recess port means in the wall of said cylindrical recess and positioned between said first and second port means when said valve element is in a neutral position, movement of said valve element in one direction being effective to connect said first port means to said recess port means and movement of said valve element in the opposite direction being effective to connect said second port means to said recess port means;

passage means in said bottom wall of said skirt portion which interconnects the interior of said skirt portion with a chamber between said bottom wall of said skirt portion and said end wall of said valve body; and means defining at least one groove in said stem which extends across the width of said end wall so that said valve element is given an initial acceleration in response to a pressure increase on either side of said end wall.

2. The bidirectional relief valve of claim 1, wherein said groove in said stem has a length along said stem which is just slightly greater than the width of said end wall, whereby the pressure on said bottom wall of said skirt portion is effective to accelerate said valve element only until said stem has moved an amount sufficient to position one end of said groove within said end wall.

3. The bidirectional relief valve of claim 1, wherein said groove extends a small amount beyond both sides of said end wall when said valve element is in said neutral position.

4. The bidirectional relief valve of claim 1, wherein said groove extend approximately 0.020 inches beyond each side of said end wall when said valve element is in said neutral position.

5. The bidirectional relief valve of claim 1, wherein said groove has a cross sectional area which is at least equal to the cross sectional area of said passage means.

6. A bidirectional relief valve for use in a damping head assembly, comprising a valve body having a cylindrical recess therein terminating in an end wall thereof;

a valve element having a stem slidably mounted in said end wall and having a hollow skirt portion movable within said cylindrical recess in said valve body, said skirt portion having a bottom wall connected to said stem and having a diameter substantially greater than said stem;

first and second port means in said skirt portion;

recess port means in the wall of said cylindrical recess and positioned between said first and second port means when said valve element is in a neutral position, movement of said valve element in one direction being effective to connect said first port means to said recess port means and movement of said valve element in the opposite direction being effective to connect said second port means to said recess port means;

means defining an opening in said bottom wall of said skirt portion which interconnects the interior of said skirt portion and the space between said bottom wall of said skirt portion and said end wall of said valve body; and said stem having a section of reduced cross sectional area which extends slightly beyond the sides of said end wall when said valve element is in said neutral position, whereby a pressure differential across said valve body acts initially on the substantially larger area of said bottom wall to accelerate movement of said valve element and then acts on the area of said stem when said valve element has moved a sufficient amount to position said reduced cross sectional area within said end wall.

7. The bidirectional relief valve of claim 6, wherein said section of reduced cross sectional area comprises a plurality of indentations in the surface of said stem which extend along the length thereof.

8. The bidirectional relief valve of claim 7, wherein said plurality of indentations have a collective cross sectional area which is at least equal to the cross sectional area of said bottom wall opening.

9. A bidirectional relief valve for use in a damping head assembly, comprising a valve body having a cylindrical recess therein terminating in an end wall thereof;

a valve element having a stem slidably mounted in said end wall and having a hollow skirt portion movable within said cylindrical recess in said valve body, said skirt portion having a bottom wall connected to said stem and having a diameter substantially greater than said stem;

first and second port means in said skirt portion;

recess port means in the wall of said cylindrical recess and positioned between said first and second port means when said valve element is in a neutral position, movement of said valve element in one direction being effective to connect said first port means to said recess port means and movement of said valve element in the opposite direction being effective to connect said second port means to said recess port means;

passage means in said bottom wall of said skirt portion which interconnects the interior of said skirt portion with a chamber between said bottom wall of said skirt portion and said end wall of said valve body; and means defining an annular groove in the wall of said cylindrical recess which connects said first port means to said chamber upon movement of said valve element in said one direction, thereby to minimize axial flow forces on said skirt portion of said valve element when said valve element is moved in said one direction.

10. The bidirectional relief valve of claim 9, wherein said annular groove is located along the length of said cylindrical recess so that said first port means remains separated from said chamber for movement of said valve element in said opposite direction from said neutral position.

11. The bidirectional relief valve of claim 9, wherein said first port means is positioned between said recess port means and said bottom wall of said skirt portion when said valve element is in said neutral position.

* * * * *